United States Patent
Ito (10) Patent No.: US 9,888,144 B2
(45) Date of Patent: Feb. 6, 2018

(54) PRINTING APPARATUS FOR SKIPPING USER AUTHENTICATION FOR AN EXTERNAL DEVICE WHEN COMMUNICATING THROUGH A DIRECT WIRELESS CONNECTION, METHOD OF CONTROLLING THE SAME, AND STORAGE MEDIUM

(71) Applicant: CANON KABUSHIKI KAISHA, Tokyo (JP)

(72) Inventor: Morikazu Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/170,722

(22) Filed: Jun. 1, 2016

(65) Prior Publication Data

US 2016/0373606 A1     Dec. 22, 2016

(30) Foreign Application Priority Data

Jun. 17, 2015  (JP) .................................. 2015-122118

(51) Int. Cl.
    *H04N 1/00*    (2006.01)
    *H04N 1/32*    (2006.01)
    *H04N 1/44*    (2006.01)

(52) U.S. Cl.
    CPC ..... *H04N 1/32106* (2013.01); *H04N 1/00307* (2013.01); *H04N 1/4413* (2013.01); *H04N 2201/0039* (2013.01); *H04N 2201/0055* (2013.01); *H04N 2201/0094* (2013.01); *H04N 2201/3233* (2013.01)

(58) Field of Classification Search
    CPC .................. H04N 1/32106; H04N 1/4413
    See application file for complete search history.

(56) References Cited

U.S. PATENT DOCUMENTS

| 9,098,225 B2 | 8/2015 | Ito | |
|---|---|---|---|
| 2005/0168768 A1 | 8/2005 | Ito | |
| 2011/0231922 A1* | 9/2011 | Azuma | .................... G06F 21/35 726/9 |
| 2012/0050773 A1 | 3/2012 | Ito | |
| 2014/0118776 A1* | 5/2014 | Lee | ........................ G06F 3/1204 358/1.15 |
| 2014/0223019 A1* | 8/2014 | McCann | ............... H04W 8/186 709/228 |
| 2014/0240768 A1 | 8/2014 | Kimura | |
| 2015/0096016 A1* | 4/2015 | Ren | .......................... G06F 21/34 726/20 |
| 2015/0317547 A1 | 11/2015 | Ito | |
| 2017/0202045 A1* | 7/2017 | Ko | ...................... H04W 76/023 |

FOREIGN PATENT DOCUMENTS

JP     2014-165594 A    9/2014

* cited by examiner

*Primary Examiner* — Benjamin O Dulaney
(74) *Attorney, Agent, or Firm* — Fitzpatrick, Cella, Harper & Scinto (57) ABSTRACT

A printing apparatus provided with an authentication function to request user information for an external apparatus has a direct wireless communication function, and does not request user information for the external apparatus under a condition that a user is logged into the printing apparatus and the external apparatus connects to the printing apparatus with the wireless communication using the direct wireless communication function.

14 Claims, 9 Drawing Sheets

■ PLEASE ENTER YOUR USERNAME AND PASSWORD.

USERNAME :

PASSWORD :

LOG IN

FIG. 6

■ IPP PRINTING SETTING

601

ON    OFF

USE AUTHENTICATION    602

ON    OFF

CANCEL    OK

PRINTING APPARATUS FOR SKIPPING USER AUTHENTICATION FOR AN EXTERNAL DEVICE WHEN COMMUNICATING THROUGH A DIRECT WIRELESS CONNECTION, METHOD OF CONTROLLING THE SAME, AND STORAGE MEDIUM

BACKGROUND OF THE INVENTION

Field of the Invention

The present invention relates to a printing apparatus, a method of controlling the printing apparatus, and a storage medium.

Description of the Related Art

In recent years, among printing apparatuses such as multi-function peripheral, printers, and the like, apparatuses provided with a wireless function have increased. A user who uses this sort of printing apparatus can operate a mobile terminal to perform wireless communication with the printing apparatus, thereby transmitting print data using an IP address of the printing apparatus that was obtained in that wireless communication as a destination, to cause the printing apparatus to perform printing of the print data.

Commonly, two types exist in wireless communication, a direct mode in which direct communication between a mobile terminal and the printing apparatus is possible even if there is no access point, and an infrastructure mode in which communication is performed through an access point. In the direct mode, the mobile terminal and the printing apparatus are both operated to perform connection settings, so it is presumed that wireless communication is performed in a state where the user is in the vicinity of the printing apparatus.

For example, Japanese Patent Laid-Open No. 2014-165594 describes using Wi-Fi Direct to connect a printing apparatus and a mobile terminal by direct wireless communication, transmitting print data from the mobile terminal to the printing apparatus, and causing the transmitted print data to be printed. Also, there are systems in which when transmitting print data from a mobile terminal to a printing apparatus, authentication processing is requested in order to prevent unauthorized use of the printing apparatus. As a method of authentication in this case, for example, IPP (Internet Printing Protocol) authentication is known in which authentication information of a user ID and a password is requested to be input at the mobile terminal.

On the other hand, the printing apparatus is provided with a login function whereby a user can log into the printing apparatus with user information input through an operation panel of the printing apparatus. In the printing apparatus, in a case where this login function has been activated, it is necessary for the user to input a user ID and a password from the operation panel of the printing apparatus.

Also, in a case where a mobile terminal of a user and a printing apparatus perform direct wireless communication using Wi-Fi Direct, it is necessary for the user to log into the printing apparatus, but when the above IPP authentication function has been activated, the user is further requested to input authentication information also at the mobile terminal. That is, in the case of a printing apparatus provided with both a login function and an IPP authentication function, it is necessary for the user to input authentication information at both the printing apparatus and the mobile terminal, and this is troublesome for the user.

SUMMARY OF THE INVENTION

An aspect of the present invention is to eliminate the above-mentioned problems with the conventional techniques.

A feature of the present invention is providing technology that, when a user wirelessly transmits a print job from a mobile terminal to a printing apparatus and causes printing of the print job, allows authentication at the mobile terminal to be unnecessary in a case where the user is logged into the printing apparatus and so user authentication is presumed to be unnecessary.

According to a first aspect of the present invention, there is provided a printing apparatus having an authentication function to request user information for an external apparatus, the printing apparatus comprising: a wireless communication unit having a direct wireless communication function, configured to perform direct wireless communication; a requesting unit configured to request user information for the external apparatus when the external apparatus connects to the printing apparatus; and a print unit configured to execute printing based on a print job received from the external apparatus, wherein the requesting unit does not request user information for the external apparatus under a condition that a user is logged into the printing apparatus and the external apparatus connects to the printing apparatus with the direct wireless communication using the direct wireless communication function.

According to a second aspect of the present invention, there is provided a printing apparatus having an authentication function to request user information for an external apparatus, the printing apparatus comprising: a wireless communication unit having a direct wireless communication function, configured to perform direct wireless communication; a requesting unit configured to request user information for the external apparatus when the external apparatus connects to the printing apparatus; and a print unit configured to execute printing based on a print job received from the external apparatus, wherein the requesting unit does not request user information for the external apparatus under a condition that the external apparatus connects to the printing apparatus with the direct wireless communication using the direct wireless communication function.

According to a third aspect of the present invention, there is provided a method of controlling a printing apparatus having a wireless communication unit having a direct wireless communication function, for performing direct wireless communication, and an authentication function to request user information for an external apparatus, the method comprising: requesting user information for the external apparatus when the external apparatus connects to the printing apparatus; and executing printing based on a print job received from the external apparatus, wherein the requesting does not request user information for the external apparatus under a condition that a user is logged into the printing apparatus and the external apparatus connects to the printing apparatus with the direct wireless communication using the direct wireless communication function.

According to a fourth aspect of the present invention, there is provided a method of controlling a printing apparatus having a wireless communication unit having a direct wireless communication function, for performing direct wireless communication, and an authentication function to request user information for an external apparatus, the method comprising: requesting user information for the external apparatus when the external apparatus connects to the printing apparatus; and executing printing based on a print job received from the external apparatus, wherein the requesting does not request user information for the external apparatus under a condition that the external apparatus connects to the printing apparatus with the direct wireless communication using the direct wireless communication function.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
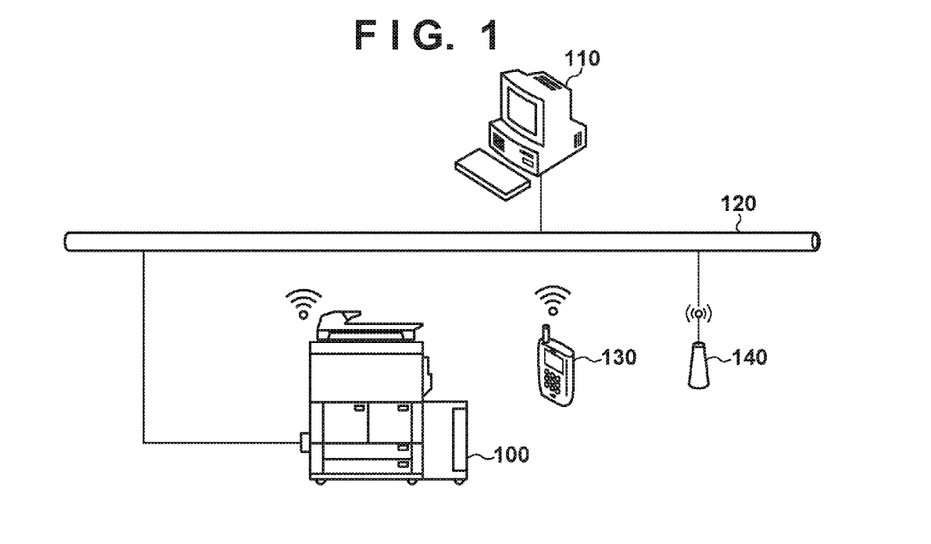
FIG. 1 shows a view illustrating an overview of a printing system according to a first embodiment of the present invention.

FIG. 1 shows a view illustrating an overview of a printing system according to a first embodiment of the present invention.

A printing apparatus 100 is connected to a network 120, and through this network 120 it is possible to communicate with an external apparatus such as a PC 110 or a mobile terminal 130. The PC 110 is capable of transmitting print data through the network 120 to the printing apparatus 100 to cause printing of the print data. The mobile terminal 130 is capable of wirelessly transmitting print data to the printing apparatus 100 through an access point 140 (infrastructure mode) or by a direct wireless connection with the printing apparatus 100 (direct mode) to cause printing of the print data. After receiving the print data, the printing apparatus 100 executes print processing based on the received print data.

Next is a detailed description of the direct mode. In Wi-Fi Direct, a Direct mode and an AP mode exist. In the Direct mode, the printing apparatus 100 and a wireless communication apparatus (here, the mobile terminal 130) are connected in a one-to-one manner by a direct wireless connection, and thus wireless communication is possible between the printing apparatus 100 and the mobile terminal 130. In the AP mode, the printing apparatus 100 is a simple AP (access point), and the printing apparatus 100 is capable of simultaneously connecting to a plurality of wireless communication apparatuses. Embodiments of the present invention apply to each of these modes.

Figure 2:
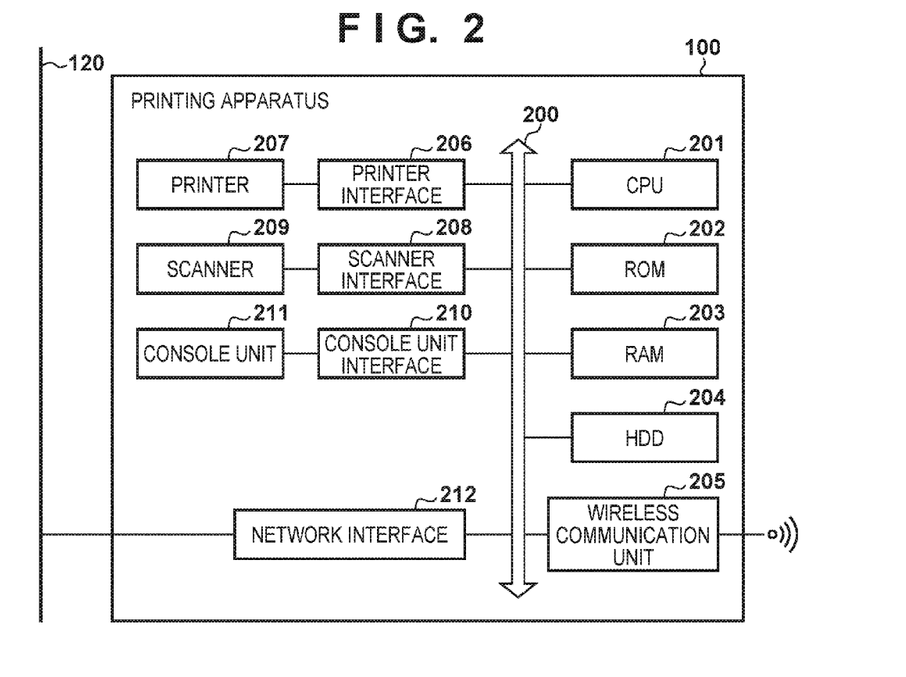
FIG. 2 is a block diagram for describing a hardware configuration of a printing apparatus according to the first embodiment.

FIG. 2 is a block diagram for describing a hardware configuration of the printing apparatus 100 according to the first embodiment. Note that the printing apparatus 100 according to the first embodiment is presumed to be a multifunction device (multi-function peripheral) having a scanner, a printer, and the like, but this printing apparatus 100 may also be a printer that has only a printer function and is not provided with a scanner function.

A CPU 201 executes a boot program stored in a ROM 202 and deploys a program installed in an HDD (hard-disk drive) 204 in a RAM 203, and by executing the program, controls operation of the printing apparatus 100. The CPU 201 is connected to other units through a bus 200 that transfers control signals and data. The boot program and various data are stored in the ROM 202. The RAM 203 is used as a main memory of the CPU 201 and as a temporary storage area such as a work area. The HDD 204 stores control programs, and various data such as print data, data of a scanned image, and the like. Note that in the printing apparatus 100 according to the first embodiment, one CPU 201 executes each process shown in flowcharts described later, but another configuration may also be adopted. For example, a configuration can also be adopted in which a plurality of CPUs cooperatively execute each process shown in the flowcharts described later.

A wireless communication unit 205 executes wireless communication between the printing apparatus 100 and a wireless communication apparatus such as the mobile terminal 130. Among the wireless communication executed by the wireless communication unit 205, there is also wireless communication directly executed between the printing apparatus 100 and the mobile terminal 130 without passing through a relay apparatus such as an access point. A printer interface 206 connects a printer (printer engine) 207 to the bus 200. The printer 207 prints an image on a sheet based on print data received from an external apparatus, a scanned image generated by a scanner 209, or the like. A scanner interface 208 connects the scanner (scanner engine) 209 to the bus 200. The scanner 209 reads an original to generate scanned image data of the original. The scanned image data generated by the scanner 209 is printed by the printer 207, or alternatively is stored in the HDD 204. A console unit interface 210 connects a console unit 211 to the bus 200. The console unit 211 is provided with a display unit having a touch panel function and a keyboard, and displays various operation screens. Thus, a user can input instructions or information to the printing apparatus 100 through the console unit 211. A network interface 212 executes communication between the printing apparatus 100 and an external apparatus connected to the network 120. When the network interface 212 receives print data transmitted from an external apparatus through the network 120, print processing is executed by the printer 207 based on that received print data.

Figure 3:
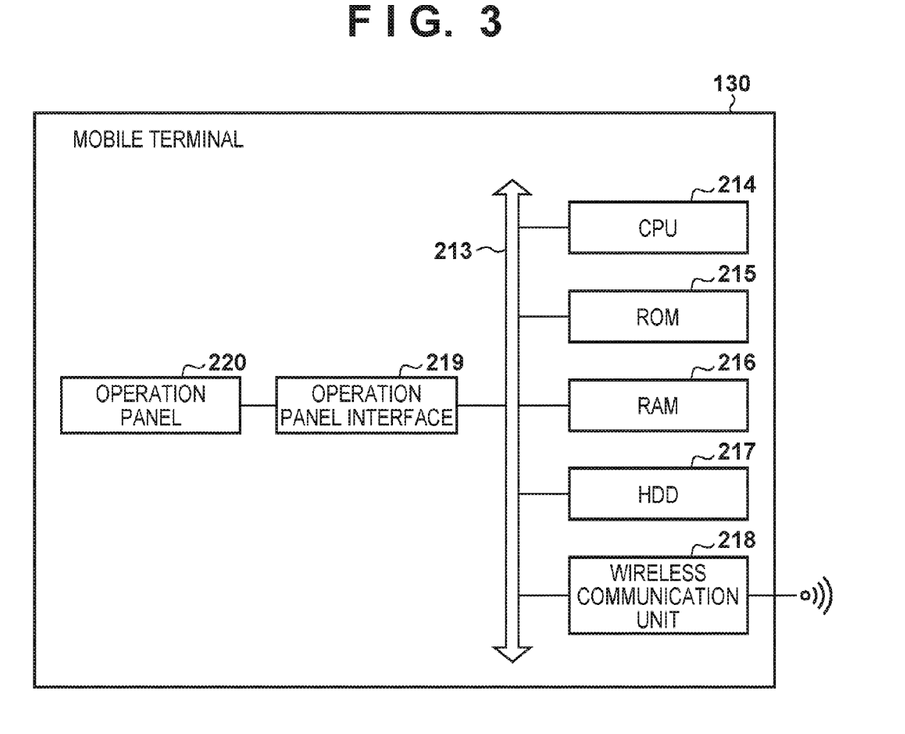
FIG. 3 is a block diagram for describing a hardware configuration of a mobile terminal according to the first embodiment.

FIG. 3 is a block diagram for describing the hardware configuration of the mobile terminal 130 according to the first embodiment.

A CPU 214 reads out a control program stored in a ROM 215 and executes various processing in order to control operation of the mobile terminal 130. The CPU 214 is connected to other units via a bus 213. The control program and various data are stored in the ROM 215. A RAM 216 is used as a main memory of the CPU 214 and as a temporary storage area such as a work area. An HDD 217 stores various data such as images. A wireless communication unit 218 executes wireless communication between the mobile terminal 130 and a wireless communication apparatus such as the printing apparatus 100. Among the wireless communication executed by the wireless communication unit 218, there is also wireless communication directly executed between the printing apparatus 100 and the mobile terminal 130 without passing through a relay apparatus such as the access point 140. An operation panel 220 is provided with a display unit having a touch panel function and a keyboard, and displays various operation screens based on screen information received through an operation panel interface 219. Also, an instruction or information that the user inputs to the mobile terminal 130 through the operation panel 220 is input through the operation panel interface 219.

Figure 4:
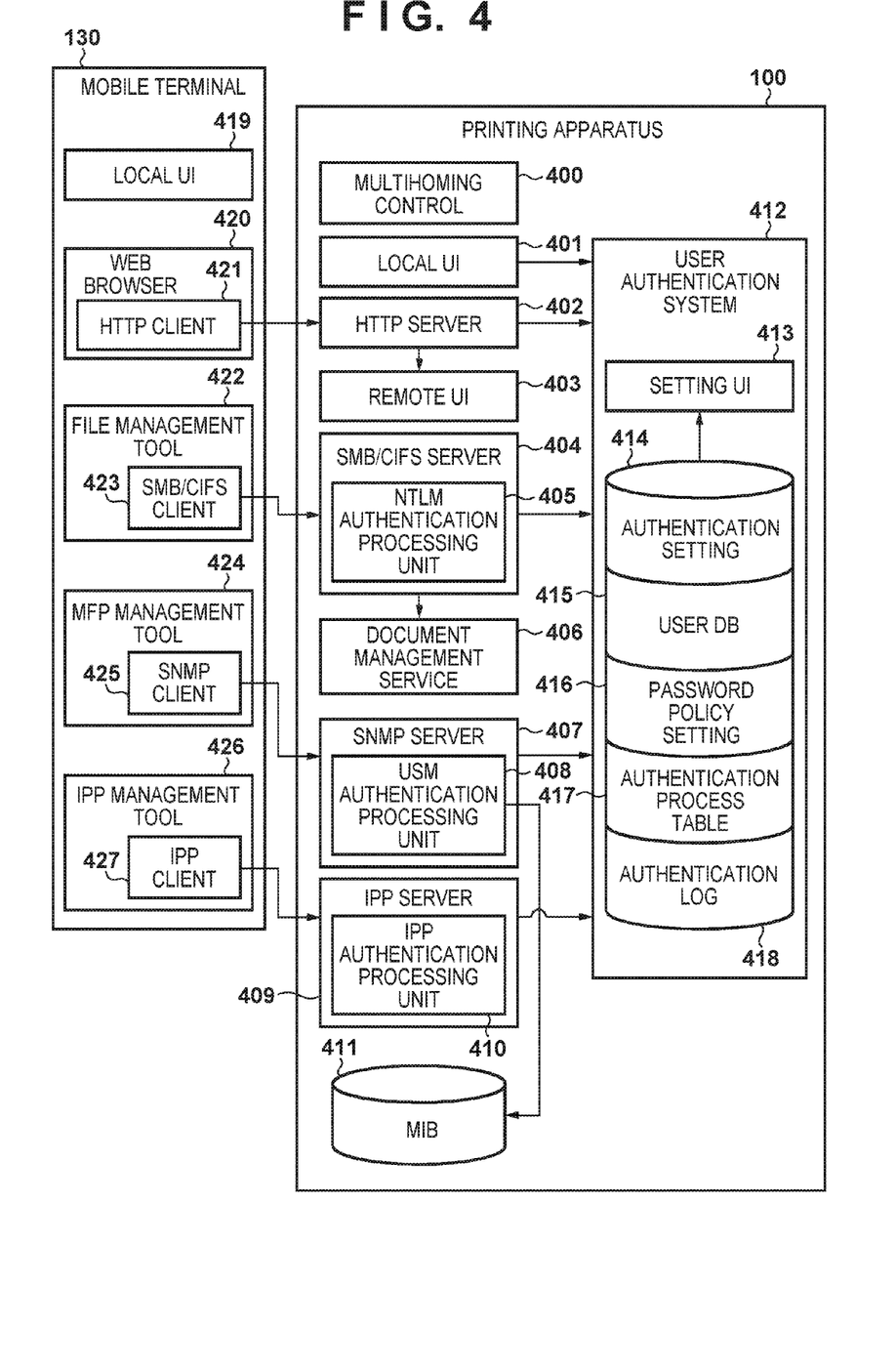
FIG. 4 is a function block diagram for describing configurations of software and data managed by the software of the printing apparatus and the mobile terminal according to the first embodiment.

FIG. 4 is a function block diagram for describing configurations of software and data managed by the software of the printing apparatus 100 and the mobile terminal 130 according to the first embodiment. Note that the arrows in FIG. 4 indicate sources and destinations of function calls in a primary use case. Below, software functions and data managed by the software will be described.

Figure 6:
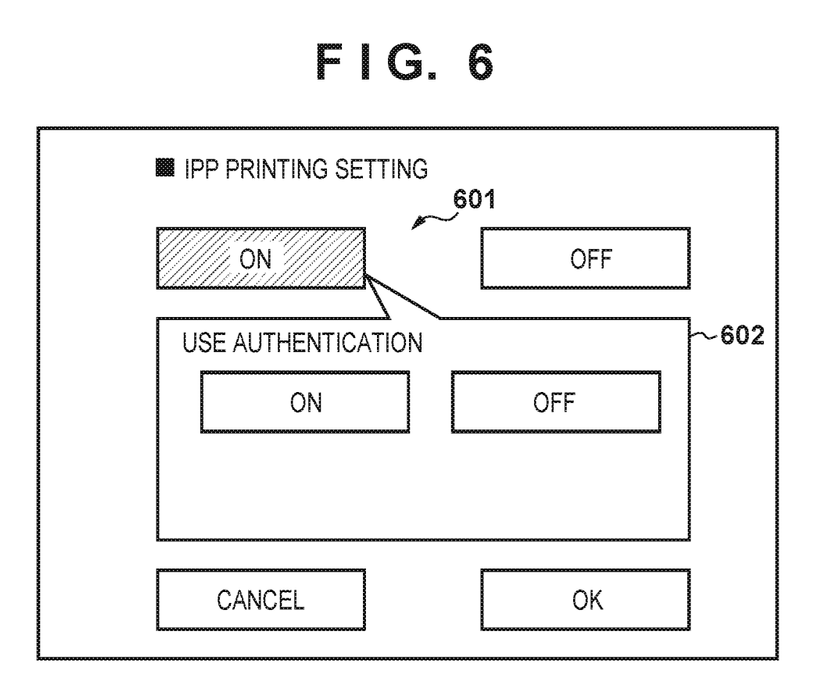
FIG. 6 shows a view illustrating an exemplary dialog box of a local UI for switching IPP authentication on/off, displayed in a console unit of the printing apparatus according to the first embodiment.

A multihoming control 400 of the printing apparatus 100 controls whether or not to perform a plurality of wireless connections, and controls switching between the direct mode and the infrastructure mode. A local UI 401 displays a user-operable user interface on the console unit 211 to provide functions of the printing apparatus 100 to the user. A user authentication system 412 performs user authentication through the local UI 401, for example. A setting UI 413 displays a screen, as shown in FIG. 6 for example, on the console unit 211, and performs setting of whether or not to perform IPP authentication. An authentication setting 414 holds the setting, indicating whether or not to perform IPP authentication, that was set in the setting UI 413. A user DB 415 stores associated user IDs and passwords. A password policy setting 416 holds a setting of whether to use capital letters or numbers, or the like, in a user password. An authentication process table 417 is applied in fields involving encoding or decoding devices, or the like. An authentication log 418 stores a history of user authentication in the user authentication system 412.

Figure 5:
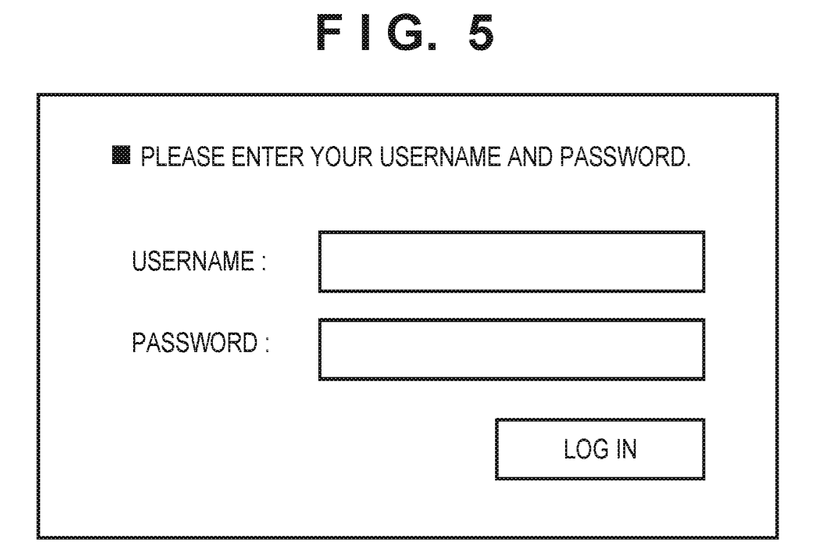
FIG. 5 shows a view illustrating an exemplary user interface displayed in an operation panel by a local UI of the mobile terminal according to the first embodiment.

FIG. 5 shows a view illustrating an exemplary user interface displayed on the operation panel 220 by a local UI 419 of the mobile terminal 130 according to the first embodiment, and shown here is one example of a user authentication screen for authenticating a user with the operation panel 220. Here, for example, the user enters a username and a password to perform authentication, and after authentication is successful, using a local UI (user interface) of the mobile terminal 130, the user can transmit an electronic document that was obtained from the HDD 217 to the printing apparatus 100, and cause the document to be printed.

The mobile terminal 130 is provided with software such as a web browser 420, a file management tool 422, an MFP management tool 424, and an IPP management tool 426.

The web browser 420 is provided with a function as an HTTP client 421 for communicating with an HTTP server 402 of the printing apparatus 100. The HTTP server 402 of the printing apparatus 100 receives a request from the web browser 420, and calls a remote UI 403. The remote UI 403 provides a user interface described in HTML to the user who operates the web browser 420. Also, the HTTP server 402 returns HTML obtained from the remote UI 403 to the web browser 420, as a response to the request from the mobile terminal 130.

The file management tool 422 is provided with a function as an SMB/CIFS client 423 for communicating with an SMB/CIFS server 404 of the printing apparatus 100. The SMB/CIFS server 404 is provided with an NTLM authentication processing unit 405 that performs processing of an NTLM (Windows NT LAN Manager) authentication protocol. When the SMB/CIFS server 404 receives a request from the file management tool 422 to view a file or save a file, or the like, the SMB/CIFS server 404 calls a document management service 406. The document management service 406 is provided with functions to view or update an electronic document (a file having an extension such as PDF, JPEG, PNG, or DOC) saved in the HDD 204, save a new file with such an electronic document, or the like.

The MFP management tool 424 is provided with a function as an SNMP client 425 for accessing an SNMP server 407 of the printing apparatus 100, to access an MIB (Management Information Base) 411 provided in the printing apparatus 100. The SNMP server 407 is provided with a USM authentication processing unit 408 that performs processing of a user authentication protocol prescribed in a USM (User-based Security Model) of SNMP Version 3. The SNMP server 407 receives an access request from the MFP management tool 424, and refers to or sets data saved in the MIB 411.

The IPP management tool 426 is provided with a function as an IPP client 427 for communicating with an IPP server 409 of the printing apparatus 100. The IPP server 409 receives a request from the IPP client 427, and calls an IPP authentication processing unit 410. The IPP server 409 returns authentication information obtained from the IPP authentication processing unit 410 to the IPP client 427, as a response to the request from the mobile terminal 130.

FIG. 6 shows a view illustrating an exemplary dialog box of a local UI for switching IPP authentication on/off, displayed in the console unit 211 of the printing apparatus 100 according to the first embodiment.

Buttons 601 are buttons for respectively setting IPP printing on/off. A dialog 602 includes buttons that switch IPP authentication on/off. Here, when ON button of the buttons 601 is depressed and so IPP printing is set to on, switching of IPP authentication on/off is displayed in the dialog 602, and IPP authentication on/off can be instructed using ON/OFF buttons in the dialog 602. In IPP printing, printing is performed by exchanging print data or the like between the mobile terminal 130 and the printing apparatus 100 using an Internet Printing Protocol (IPP). The on/off setting for IPP authentication selects whether or not authentication by a username and a password is performed in the printing apparatus 100 and the mobile terminal 130 when performing IPP printing. The content that has been set in this screen is saved in the RAM 203 and is referred to in processing described later.

Figure 7:
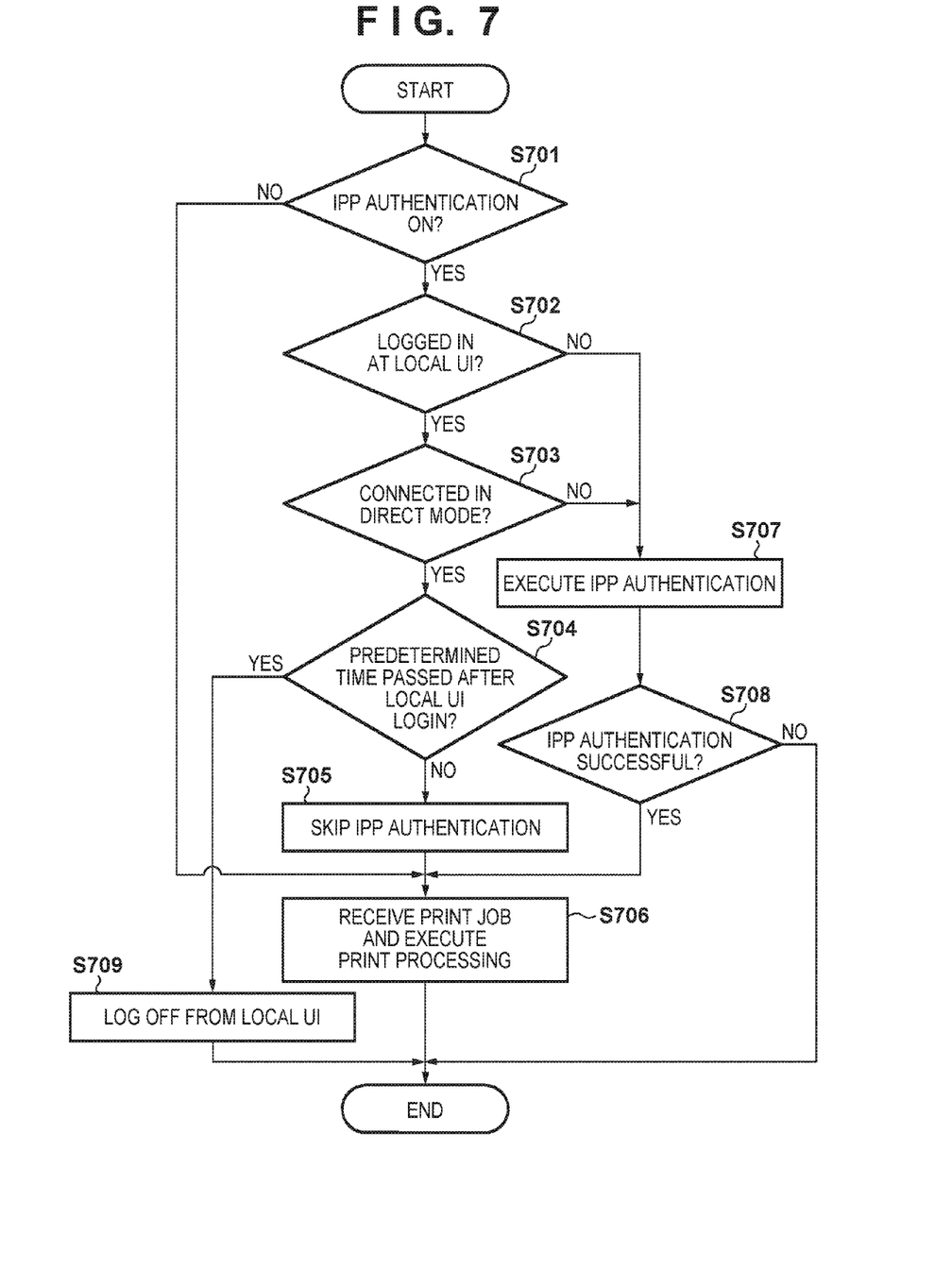
FIG. 7 is a flowchart for describing processing related to authentication control when the printing apparatus according to the first embodiment receives a print job.

FIG. 7 is a flowchart for describing processing related to authentication control when the printing apparatus 100 according to the first embodiment receives a print job. This processing is realized by the CPU 201 executing a program that has been deployed into the RAM 203.

In Step S701, the CPU 201 determines whether or not IPP authentication is set to on. Here, the CPU 201 determines whether or not the IPP authentication ON button of the dialog 602 in the screen in FIG. 6 is set to on, so that IPP authentication is set to be performed, and if this ON button is set to on, processing proceeds to Step S702, and if this ON button is set to off, processing proceeds to Step S706. In Step S706, the CPU 201 receives a print job from the mobile terminal 130 without IPP authentication, and executes printing in accordance with the print job.

In Step S702, the CPU 201 determines whether or not the user is logged into the printing apparatus 100 via the local UI 401, that is, determines whether or not the user has been authenticated, and if determined that the user is logged in, processing proceeds to Step S703, and if determined that the user is not logged in, processing proceeds to Step S707. In Step S703, the CPU 201 determines whether or not the printing apparatus 100 is connected to the mobile terminal 130 in the direct mode, and if determined that the printing apparatus 100 is connected to the mobile terminal 130 in the direct mode, processing proceeds to Step S704, and if determined that the printing apparatus 100 is connected to the mobile terminal 130 in the infrastructure mode, processing proceeds to Step S707. In Step S704, the CPU 201 determines whether or not a predetermined time period has passed since the user logged into the printing apparatus 100, and if it is determined that the predetermined time period has passed, processing proceeds to Step S709, where the user is logged off from the local UI, and then this processing is ended. On the other hand, if it is determined in Step S704 that the predetermined time period has not passed, processing proceeds to Step S705, where the CPU 201 skips IPP authentication and proceeds to Step S706. In Step S706, the CPU 201 receives a print job from the mobile terminal 130 and executes print processing according to the print job, and then this processing is ended.

In Step S507, the CPU 201 performs IPP authentication in cooperation with the CPU 214 of the mobile terminal 130, and then proceeds to Step S708. In Step S708, the CPU 201 determines whether or not IPP authentication was successful in cooperation with the CPU 214 of the mobile terminal 130, and if determined that IPP authentication was successful, processing proceeds to Step S706, and if determined that IPP authentication was not successful, this processing is ended.

By this processing, when the user is logged into the printing apparatus 100 using the local UI and the printing apparatus 100 is connected to the mobile terminal 130 in the direct mode, the user is judged to be near the printing apparatus 100, so IPP authentication processing is skipped. Therefore, authentication processing in the mobile terminal 130 can be omitted. Also, even in a case where the user is logged into the printing apparatus 100 using the local UI and the printing apparatus 100 is connected to the mobile terminal 130 in the direct mode, if the predetermined time period has passed since the user logged in using the local UI, there is a high possibility that the user is not near the printing apparatus 100. Accordingly, in such a case, the user who is logged in is temporarily logged off, and printing first becomes possible after the user logs into the printing apparatus 100 again.

Figure 8:
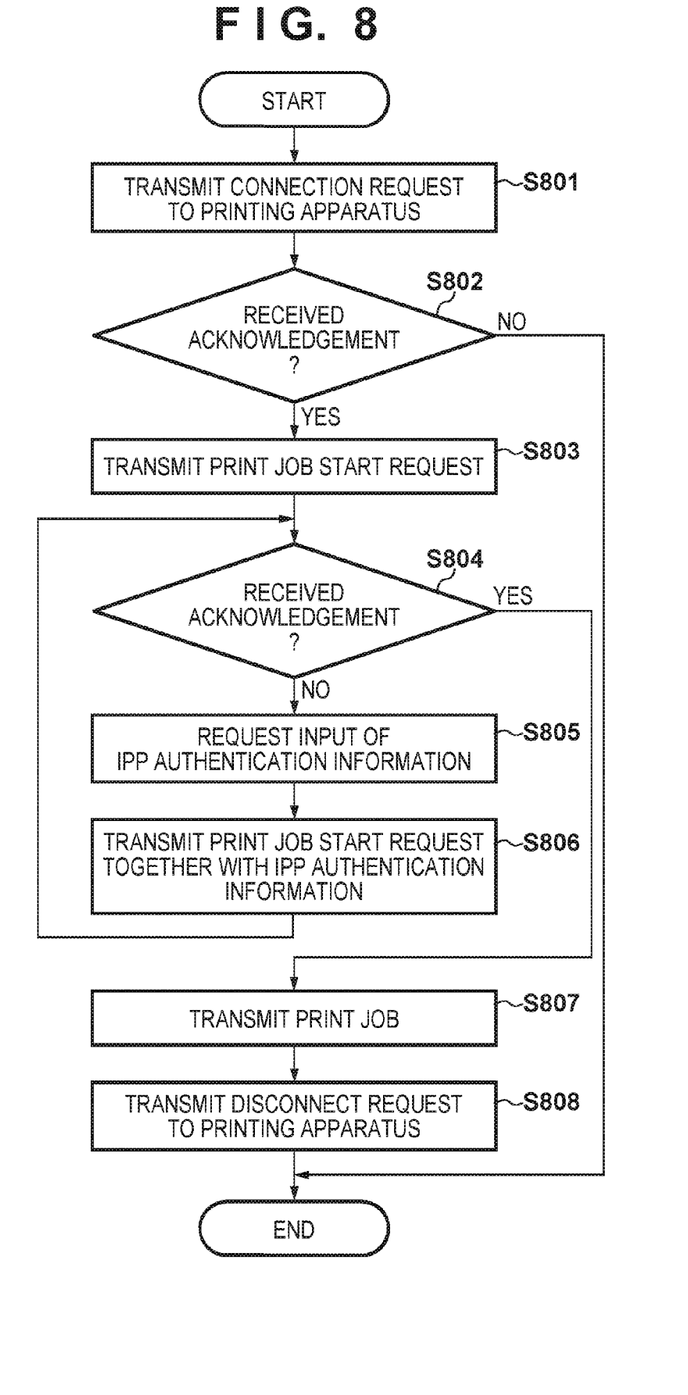
FIG. 8 is a flowchart for describing processing when the mobile terminal according to the first embodiment transmits a print job to the printing apparatus.

FIG. 8 is a flowchart for describing processing when the mobile terminal 130 according to the first embodiment transmits a print job to the printing apparatus 100. This processing is realized by the CPU 214 executing a program that has been deployed into the RAM 216.

First, in Step S801, the CPU 214 transmits a connection request to the printing apparatus 100, and then processing proceeds to Step S802. In Step S802, the CPU 214 determines whether or not an acknowledgement of the connection request is received from the printing apparatus 100 in response to the connection request, and when determined that an acknowledgement is not received, here processing is ended. When it is determined in Step S802 that an acknowledgment is received, processing proceeds to Step S803, where the CPU 214 transmits a print job start request to the printing apparatus 100. Next, processing proceeds to Step S804, where the CPU 214 determines whether or not an acknowledgement is received from the printing apparatus 100 in response to the print job start request transmitted in Step S803, and when determined that an acknowledgement is received, processing proceeds to Step S807, and when it is determined that an acknowledgment is not received, processing proceeds to Step S805. In Step S805, the CPU 214 requests input of IPP authentication information with the local UI 419 of the mobile terminal 130, and then processing proceeds to Step S806. At this time, the CPU 214 displays a screen as shown in FIG. 5 for example in the operation panel 220, and receives input of IPP authentication information. Also, in Step S806, the CPU 214 transmits a print job start request together with the input IPP authentication information to the printing apparatus 100, and then processing proceeds to Step S804.

When the CPU 214 determines in Step S804 that an acknowledgment is received from the printing apparatus 100, processing proceeds to Step S807, where the CPU 214 transmits the print job to the printing apparatus 100, and processing proceeds to Step S808. In Step S808, the CPU 214 transmits a disconnect request to the printing apparatus 100, and then this processing is ended.

Note that in Step S804, an acknowledgement is returned from the printing apparatus 100 in response to the print job start request if the predetermined time period has not passed since the user logged into the printing apparatus 100 and wireless communication between the printing apparatus 100 and the mobile terminal 130 is performed in the direct mode. Accordingly, the mobile terminal 130 can transmit a print job to the printing apparatus and cause the print job to be printed without performing IPP authentication.

As described above, according to the first embodiment, within a predetermined time period since the user logged in at the printing apparatus, and if wireless communication is performed between the printing apparatus and the mobile terminal in the direct mode, it is possible to execute a print job with IPP authentication omitted between the printing apparatus and the mobile terminal.

Second Embodiment

A method of controlling IPP authentication according to the form of connection (direct mode or infrastructure mode) in wireless communication, the IPP authentication on/off setting, and the login state of the local UI in the printing apparatus was described in the first embodiment. On the other hand, in the second embodiment, a setting of whether or not to permit omission of IPP authentication is provided in addition to the configuration of the above-described first embodiment. Note that the hardware configurations of the printing system, the printing apparatus 100, and the mobile terminal 130 according to the second embodiment are the same as in the above-described first embodiment, and so a description of those is omitted here.

Figure 9:
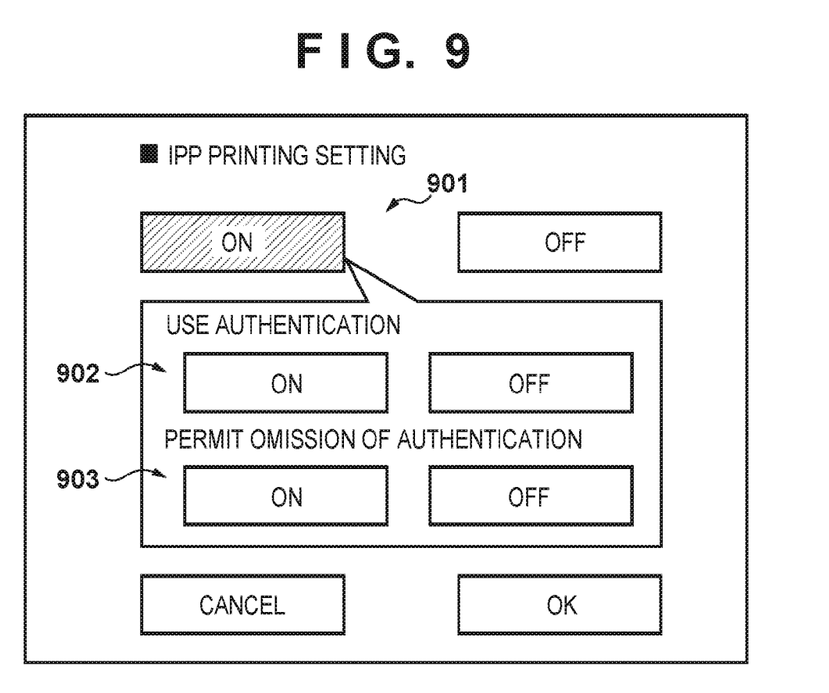
FIG. 9 shows a view illustrating an exemplary dialog box for setting IPP authentication on/off, displayed in a console unit of a printing apparatus according to a second embodiment.

FIG. 9 shows a view illustrating an exemplary dialog box for setting IPP authentication on/off, displayed in the console unit 211 of the printing apparatus 100 according to the second embodiment.

A button 901 is a button that switches IPP printing on/off. When IPP printing is set to on, buttons 902 that set IPP authentication on/off as well as in the first embodiment (FIG. 6), and further buttons 903 that set authentication omission on/off, are also displayed. The content that has been set in this screen is saved in the RAM 203 and is referred to in processing described later.

Figure 10:
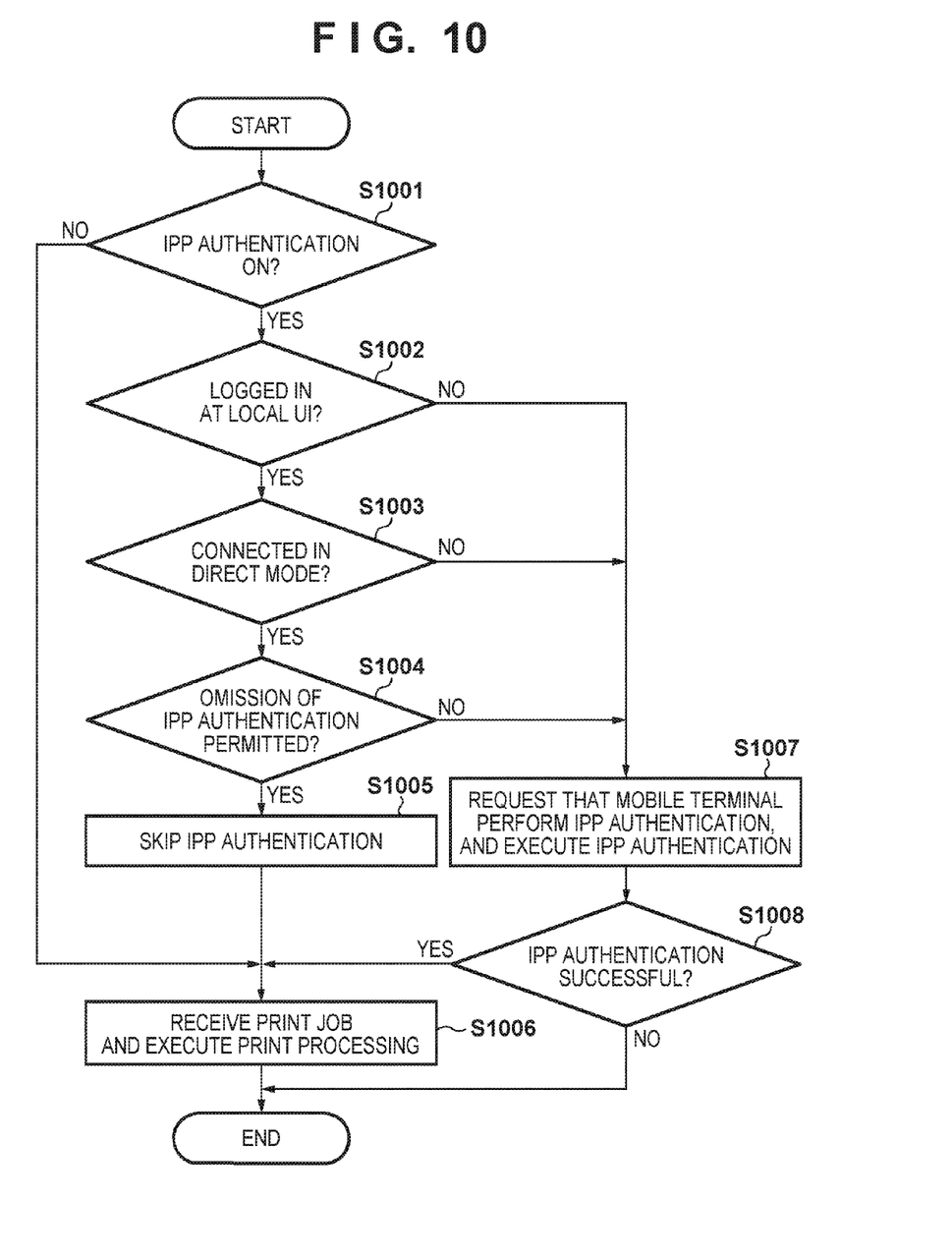
FIG. 10 is a flowchart for describing authentication control and print processing in the printing apparatus according to the second embodiment.

FIG. 10 is a flowchart for describing authentication control and print processing in the printing apparatus 100 according to the second embodiment. This processing is realized by the CPU 201 executing a program that has been deployed into the RAM 203.

First, in Step S1001, the CPU 201 determines whether or not, in the printing apparatus 100, IPP authentication is set to on using the buttons 902 in the screen shown in FIG. 9, and when determined that IPP authentication is set to on, processing proceeds to Step S1002, and when determined that IPP authentication is set to off, processing proceeds to Step S1006. In Step S1002, the CPU 201 determines whether or not the user is logged in using the local UI 401, and if it is determined that the user is logged in, processing proceeds to Step S1003, and if it is determined that the user is not logged in, processing proceeds to Step S1007. In Step S1003, the CPU 201 determines whether or not the printing apparatus 100 is connected to the mobile terminal 130 in the direct mode, and if it is determined that the printing apparatus 100 is connected to the mobile terminal 130 in the direct mode, processing proceeds to Step S1004, and if it is determined that the printing apparatus 100 is connected to the mobile terminal 130 in the infrastructure mode, processing proceeds to Step S1007. In Step S1004, the CPU 201 determines whether or not permission to omit IPP authentication is set to on using the buttons 903 in the screen shown in FIG. 9, and if permission to omit IPP authentication is set to on, processing proceeds to Step S1005, and if permission to omit IPP authentication is not set to on, processing proceeds to Step S1007. In Step S1005, the CPU 201 skips IPP authentication and proceeds to Step S1006. In Step S1006, the CPU 201 receives a print job from the mobile terminal 130 and executes print processing according to the print job, and then this processing is ended.

On the other hand, when the user is not logged in at the local UI 401, or when the printing apparatus 100 is not connected to the mobile terminal 130 in the direct mode, and also omission of IPP authentication is not permitted, processing proceeds to Step S1007, where the CPU 201 performs IPP authentication together with the CPU 214 of the mobile terminal 130. Then processing proceeds to Step S1008, where the CPU 201 and the CPU 214 determine whether or not IPP authentication was successful, and if authentication was successful, processing proceeds to Step S1006, and if authentication was not successful, this processing is ended. In Step S1006, the CPU 201 receives a print job from the mobile terminal 130 and executes print processing according to the print job, and then this processing is ended.

As described above, according to the second embodiment, in addition to the configuration of the first embodiment, it is possible to set whether or not to permit omission of IPP authentication in the printing apparatus. Therefore, in a case where the user is logged in the printing apparatus and wireless communication with the mobile terminal is in the direct mode, if omission of IPP authentication is permitted, it is possible to issue a print job from the mobile terminal to the printing apparatus with IPP authentication between the printing apparatus and the mobile terminal omitted.

Third Embodiment

Authentication control in a configuration where the form of connection in wireless communication and IPP authentication are independently set was described in the above first embodiment. However, in the third embodiment, IPP authentication is not set on/off by a user, but rather, is set in conjunction with the form of connection in wireless communication. Note that the hardware configurations of the printing system, the printing apparatus 100, and the mobile terminal 130 according to the third embodiment are the same as in the above-described first embodiment, and so a description of those is omitted here.

Figure 11:
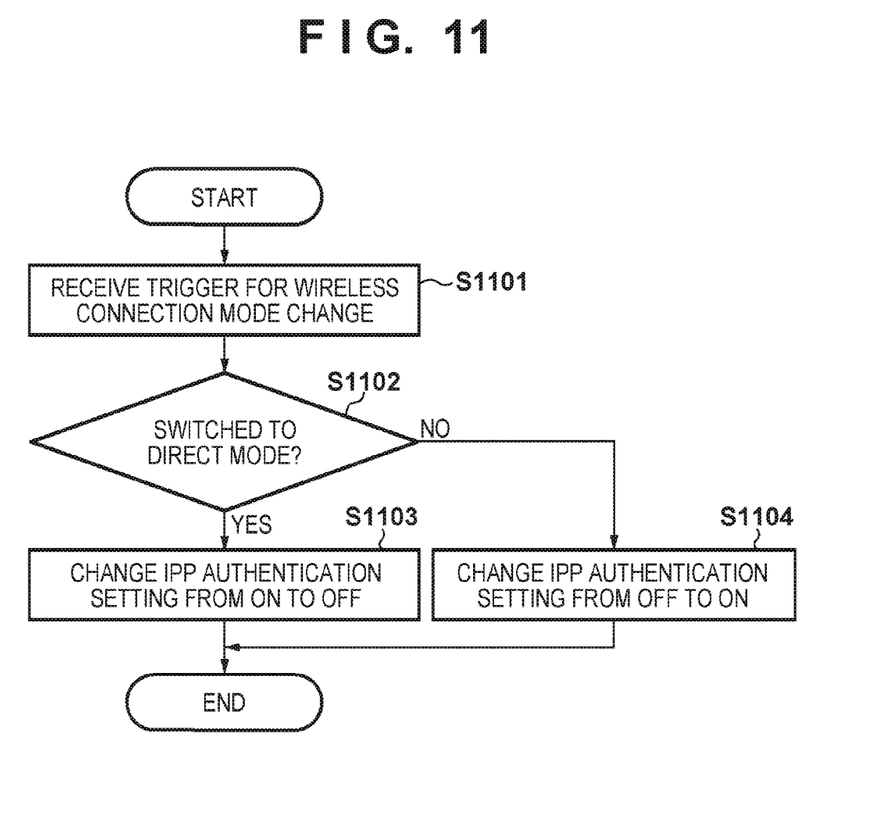
FIG. 11 is a flowchart for describing processing in which a printing apparatus according to a third embodiment performs IPP authentication control in conjunction with a wireless communication connection method.

FIG. 11 is a flowchart for describing processing in which the printing apparatus 100 according to the third embodiment performs IPP authentication control in conjunction with the form of connection in wireless communication. Software of the printing apparatus 100 is stored as a program in the ROM 202 of the printing apparatus 100, or in the HDD 204, and the functions described below are realized by the CPU 201 executing a program that was deployed into the RAM 203 when executing the program.

Other than in a case of multihoming, this processing is started in conjunction with the wireless connection method. First, in Step S1101, when the CPU 201 receives a trigger for a change in the wireless communication connection mode, processing proceeds to Step S1102. In Step S1102, the CPU 201 determines whether or not the wireless connection mode has been switched from the infrastructure mode to the direct mode. If the wireless connection mode has been switched to the direct mode, processing proceeds to Step S1103, and if the wireless connection mode has not been switched to the direct mode, processing proceeds to Step S1104. In Step S1103, the CPU 201 changes the IPP authentication setting from on to off, that is, the CPU 201 sets IPP authentication as unnecessary, and then this processing is ended. On the other hand, in Step S1104, the CPU 201 changes the IPP authentication setting from off to on, that is, the CPU 201 sets IPP authentication as necessary, and then this processing is ended.

As described above, according to the third embodiment, it is possible to set whether or not to permit omission of IPP authentication according to the connection mode of wireless communication between the printing apparatus and the mobile terminal. Therefore, by switching the wireless connection between the printing apparatus and the mobile terminal to the direct mode, it is possible to issue a print job from the mobile terminal to the printing apparatus with IPP authentication omitted.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-122118, filed Jun. 17, 2015 which is hereby incorporated by reference herein in its entirety.

What is claimed is:

1. A printing apparatus comprising:
a memory storing a set of instructions; and
at least one processor that executes the instructions to function as:
a wireless communication unit configured to perform a wireless communication being compliant with Wi-Fi Direct;
a reception unit configured to receive a login request via an operation unit of the printing apparatus;
a login unit configured to cause a user pertaining to the login request to log into the printing apparatus in accordance with having received the login request by the reception unit;
a print authentication unit configured to send an authentication request to request user information for an external apparatus in a case in which a print request is received from the external apparatus, and to notify the external apparatus of whether or not the print request is accepted based on the user information received from the external apparatus as a response to the authentication request; and
a print control unit configured to execute printing based on print data received from the external apparatus,
wherein, in a case in which the print request is received from an external apparatus with the wireless communication being compliant with the Wi-Fi Direct, the print authentication unit notifies the external apparatus that the printing apparatus accepts the print request without sending the authentication request to the external apparatus in a state in which a user logs into the printing apparatus, and
wherein, in a case in which the print request is received from an external apparatus with a communication other than the wireless communication being compliant with the Wi-Fi Direct, the print authentication unit sends the authentication request to the external apparatus, and then determines whether or not to accept the print request based on a response to the authentication request from the external apparatus, and notifies the external apparatus of whether or not the print request is accepted based on the determination.

2. The printing apparatus according to claim 1, the at least one processor further functioning as:
a setting unit configured to set whether or not to send the authentication request by the print authentication unit upon printing by the printing apparatus according to a user instruction,
wherein, in the case in which the print request is received from an external apparatus with the wireless communication being compliant with the Wi-Fi Direct in the state in which a user logs into the printing apparatus, the print authentication unit notifies the external apparatus that the printing apparatus accepts the print request without sending the authentication request to the external apparatus regardless of a setting by the setting unit, and
wherein in the state in which the print request is received from an external apparatus with a communication other than the wireless communication being compliant with the Wi-Fi Direct, the print authentication unit determines whether or not to send the authentication request to the external apparatus based on the setting by the setting unit.

3. The printing apparatus according to claim 1, the at least one processor further functioning as:
a setting unit configured to set whether or not to permit an omission of sending the authentication request by the print authentication unit upon printing according to a user instruction,
wherein, in a case in which the setting unit sets to permit the omission of the sending of the authentication request by the print authentication unit, the print authentication unit notifies the external apparatus that the printing apparatus accepts the print request without sending the authentication request to the external apparatus in the case in which the print request is received with the wireless communication being compliant with the Wi-Fi Direct in the state in which a user logs into the printing apparatus, and
wherein, in a case in which the setting unit sets to not permit the omission of the sending of the authentication request by the print authentication unit, the print authentication unit sends the authentication request to the external apparatus even in the case in which the print request is received with the wireless communication being compliant with the Wi-Fi Direct in the state in which a user logs into the printing apparatus.

4. The printing apparatus according to claim 1,
wherein the user information includes a username and a password.

5. The printing apparatus according to claim 1,
wherein the print request is a request being compliant with a standard of Internet Printing Protocol, and
the print authentication unit sends the authentication request to the external apparatus in a case in which the request that is compliant with the standard of Internet Printing Protocol is received.

6. A printing apparatus comprising:
a memory storing a set of instructions; and
at least one processor that executes the instructions to function as:
  a wireless communication unit configured to perform a wireless communication being compliant with Wi-Fi Direct;
  a print authentication unit configured to send an authentication request to request user information for an external apparatus in a case in which a print request is received from the external apparatus, and to notify the external apparatus of whether or not the print request is accepted based on the user information received from the external apparatus as a response to the authentication request; and
  a print control unit configured to execute printing based on print data received from the external apparatus,
wherein, in a case in which the print request is received from an external apparatus with the wireless communication being compliant with the Wi-Fi Direct, the print authentication unit notifies the external apparatus that the printing apparatus accepts the print request without sending the authentication request to the external apparatus, and
wherein, in a case in which the print request is received from an external apparatus with a communication other than the wireless communication being compliant with the Wi-Fi Direct, the print authentication unit sends the authentication request to the external apparatus, and determines whether or not to accept the print request based on a response to the authentication request and notifies the external apparatus of whether or not to accept the print request based on the determination.

7. The printing apparatus according to claim 6, the at least one processor further functioning as:
a setting unit configured to set whether or not to send the authentication request by the print authentication unit upon printing according to a user instruction,
wherein, in the case in which the print request is received from an external apparatus with the wireless communication being compliant with the Wi-Fi Direct in a state in which a user logs into the printing apparatus, the print authentication unit notifies the external apparatus that the printing apparatus accepts the print request without sending the authentication request to the external apparatus regardless of a setting by the setting unit, and
wherein, in the state in which the print request is received from an external apparatus with a communication other than the wireless communication being compliant with the Wi-Fi Direct, the print authentication unit determines whether or not to send the authentication request to the external apparatus based on the setting by the setting unit.

8. The printing apparatus according to claim 6, the at least one processor further functioning as:
a setting unit configured to set whether or not to permit an omission of sending the authentication request by the print authentication unit upon printing according to a user instruction,
wherein, in a case in which the setting unit sets to permit the omission of the sending the authentication request by the print authentication unit, the print authentication unit notifies the external apparatus that the printing apparatus accepts the print request without sending the authentication request to the external apparatus in the case in which the print request is received with the wireless communication being compliant with the Wi-Fi Direct, and
wherein, in a case in which the setting unit sets to not permit the omission of the sending of the authentication request by the print authentication unit, the print authentication unit sends the authentication request to the external apparatus even in the case in which the print request is received with the wireless communication being compliant with the Wi-Fi Direct.

9. The printing apparatus according to claim 6,
wherein the user information includes a username and a password.

10. The printing apparatus according to claim 6,
wherein the print request is a request being compliant with a standard of Internet Printing Protocol, and
the print authentication unit sends the authentication request to the external apparatus in a case that the request that is compliant with the standard of Internet Printing Protocol is received.

11. A method of controlling a printing apparatus having a wireless communication unit for performing a wireless communication being compliant with Wi-Fi Direct, the method comprising:
receiving a login request via an operation unit of the printing apparatus;
causing a user pertaining to the login request to log into the printing apparatus in accordance with having received the login request in the receiving;
sending an authentication request to request user information for the external apparatus in a case in which a print request is received from the external apparatus, and notifying the external apparatus of whether or not the print request is accepted based on the user information received from the external apparatus as a response to the authentication request; and
executing printing based on print data received from the external apparatus,
wherein, in a case in which the print request is received from an external apparatus with the wireless communication being compliant with the Wi-Fi Direct, in the sending, the external apparatus is notified that the printing apparatus accepts the print request without sending the authentication request to the external apparatus in a state in which a user logs into the printing apparatus, and
wherein, in a state in which the print request is received from an external apparatus with a communication other than the wireless communication being compliant with the Wi-Fi Direct, in the sending, the authentication request is sent to the external apparatus, and then it is determined whether or not to accept the print request based on a response to the authentication request from the external apparatus, and the external apparatus is notified of whether or not the print request is accepted based on the determination.

12. A method of controlling a printing apparatus having a wireless communication unit for performing a wireless communication being compliant with Wi-Fi Direct, the method comprising:

sending an authentication request to request user information for an external apparatus in a case in which a print request is received from the external apparatus, and notifying the external apparatus of whether or not the print request is accepted based on the user information received from the external apparatus as a response to the authentication request; and executing printing based on print data received from the external apparatus, wherein, in a case in which the print request is received from an external apparatus with the wireless communication being compliant with the Wi-Fi Direct, in the sending, the external apparatus is notified that the printing apparatus accepts the print request without sending the authentication request to the external apparatus, and wherein, in a case in which the print request is received from an external apparatus with a communication other than a wireless communication being compliant with the Wi-Fi Direct, in the sending, the authentication request is sent to the external apparatus, and it is determined whether or not to accept the print request based on a response to the authentication request and the external apparatus is notified of whether or not to accept the print request based on the determination.

13. A non-transitory computer-readable storage medium storing a program for causing a processor to execute a method of controlling a printing apparatus having a wireless communication unit for performing a wireless communication being compliant with Wi-Fi Direct, the method comprising:

receiving a login request via an operation unit of the printing apparatus;

causing a user pertaining to the login request to log into the printing apparatus in accordance with having received the login request in the receiving;

sending an authentication request to request user information for the external apparatus in a case in which a print request is received from the external apparatus, and notifying the external apparatus of whether or not the print request is accepted based on the user information received from the external apparatus as a response to the authentication request; and executing printing based on print data received from the external apparatus, wherein, in a case in which the print request is received from an external apparatus with the wireless communication being compliant with the Wi-Fi Direct, in the sending, the external apparatus is notified that the printing apparatus accepts the print request without sending the authentication request to the external apparatus in a state in which a user logs into the printing apparatus, and wherein in a state in which the print request is received from an external apparatus with a communication other than the wireless communication being compliant with the Wi-Fi Direct, in the sending, the authentication request is sent to the external apparatus, and then it is determined whether or not to accept the print request based on a response to the authentication request from the external apparatus, and the external apparatus is notified of whether or not the print request is accepted based on the determination.

14. A non-transitory computer-readable storage medium storing a program for causing a processor to execute a method of controlling a printing apparatus having a wireless communication unit for performing a wireless communication being compliant with Wi-Fi Direct, the method comprising:

sending an authentication request to request user information for an external apparatus in a case in which a print request is received from the external apparatus, and notifying the external apparatus of whether or not the print request is accepted based on the user information received from the external apparatus as a response to the authentication request; and executing printing based on print data received from the external apparatus, wherein, in a case that the print request is received from an external apparatus with the wireless communication being compliant with the Wi-Fi Direct, in the sending, the external apparatus is notified that the printing apparatus accepts the print request without sending the authentication request to the external apparatus, and wherein, in a case in which the print request is received from an external apparatus with a communication other than a wireless communication being compliant with the Wi-Fi Direct, in the sending, the authentication request is sent to the external apparatus, and it is determined whether or not to accept the print request based on a response to the authentication request and the external apparatus is notified of whether or not to accept the print request based on the determination.

\* \* \* \* \*